United States Patent [19]
Sherman

[11] Patent Number: 5,947,277
[45] Date of Patent: Sep. 7, 1999

[54] ATTRACTIVE HANGING RECEPTACLE FOR PLASTIC BAGS

[76] Inventor: Victoria Sherman, 3116 Alhambra Cir., Coral Gables, Fla. 33134

[21] Appl. No.: 08/971,268

[22] Filed: Nov. 17, 1997

Related U.S. Application Data

[63] Continuation-in-part of application No. 08/548,645, Oct. 26, 1995, Pat. No. 5,687,840, which is a continuation-in-part of application No. 08/248,665, May 25, 1994, Pat. No. 5,487,467.

[51] Int. Cl.$^6$ ................................................. B65D 83/00
[52] U.S. Cl. .................... 206/216; D9/311; 206/457; 206/554; 383/41; 383/121.1
[58] Field of Search ....................... D3/234–236; D9/311; 206/216, 457, 554; 221/303; 242/160.1–160.4; 383/41, 97, 121.1; 446/72–74, 268

[56] References Cited

U.S. PATENT DOCUMENTS

| | | | |
|---|---|---|---|
| D. 164,639 | 9/1951 | Jakubovitz | D3/236 |
| D. 181,304 | 10/1957 | Mann | D3/236 |
| 1,511,041 | 10/1924 | Rovira | 446/74 |
| 1,533,428 | 4/1925 | Kittleson | 446/74 |
| 2,129,654 | 9/1938 | Dennis | 383/86 |
| 3,301,387 | 1/1967 | Erickson | 383/121.1 |
| 5,147,119 | 9/1992 | Harris | 221/303 |
| 5,285,927 | 2/1994 | Pruitt | 221/303 |
| 5,341,933 | 8/1994 | Willows | 206/554 |
| 5,375,928 | 12/1994 | Yarng et al. | 206/457 |

*Primary Examiner*—Jim Foster
*Attorney, Agent, or Firm*—Malloy & Malloy, P.A.

[57] ABSTRACT

A decorative receptacle for plastic shopping bags as well as a variety of other, different types of articles, the receptacle comprising an upper member having the general structure and appearance of an upper portion of a doll body, whether a human figure or an animal figure, and a lower element structured and disposed for receiving a variety of different articles therein. The lower element, which has the general shape and configuration of a skirt, is preferably removably attached to the upper member to permit laundering, and extends downwardly from the upper member. The lower element defines a cavity in which the articles can be stored, preferably in a generally vertical, stacked array, and also has at least one access opening in communication with the cavity that is sized and configured to allow passage therethrough of one or more of the various articles. The receptacle includes means for suspending the receptacle from a vertical surface or orientating the receptacle on a horizontal surface so as to substantially prevent the upper member from falling forward and thereby, allows primarily a full display of both the upper member and lower element when so positioned. The receptacle may also include structure on the lower element for either partially or fully closing the opening.

16 Claims, 5 Drawing Sheets

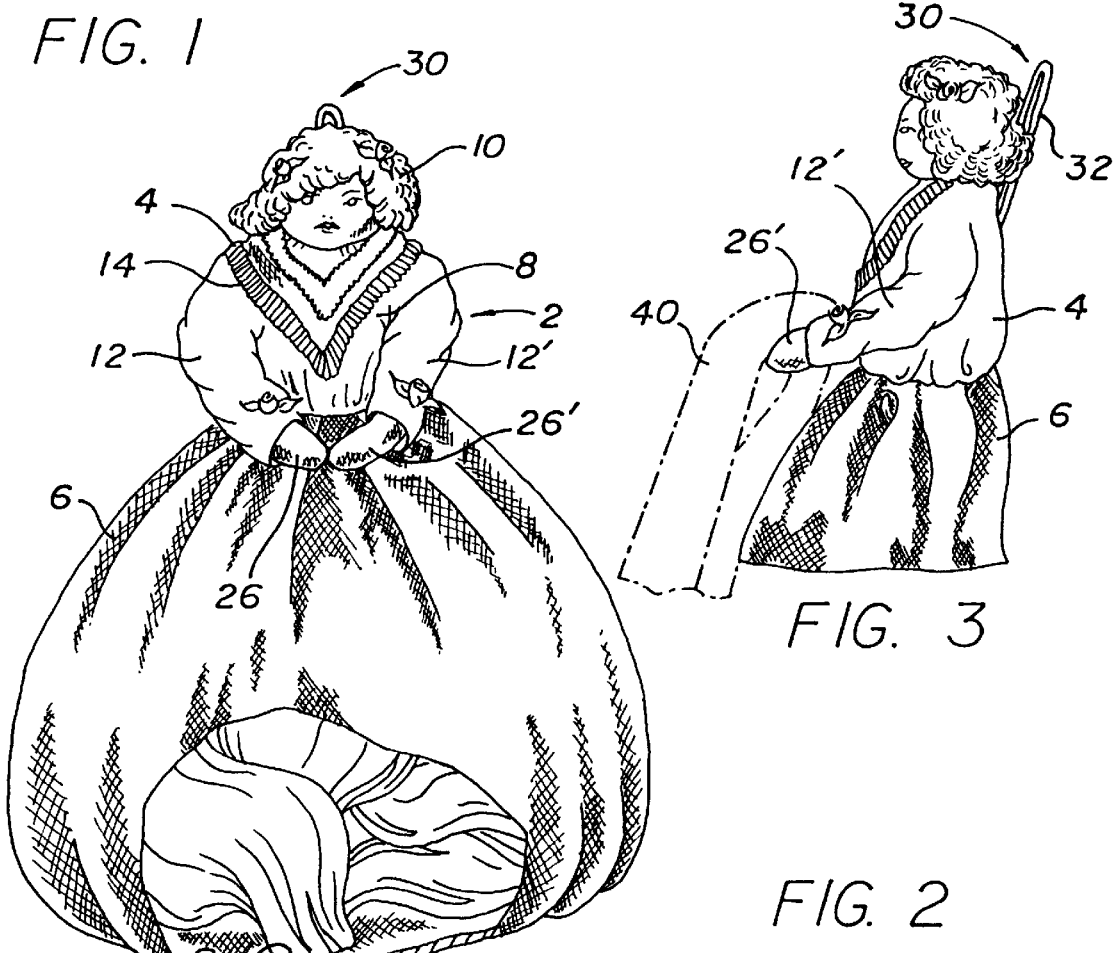
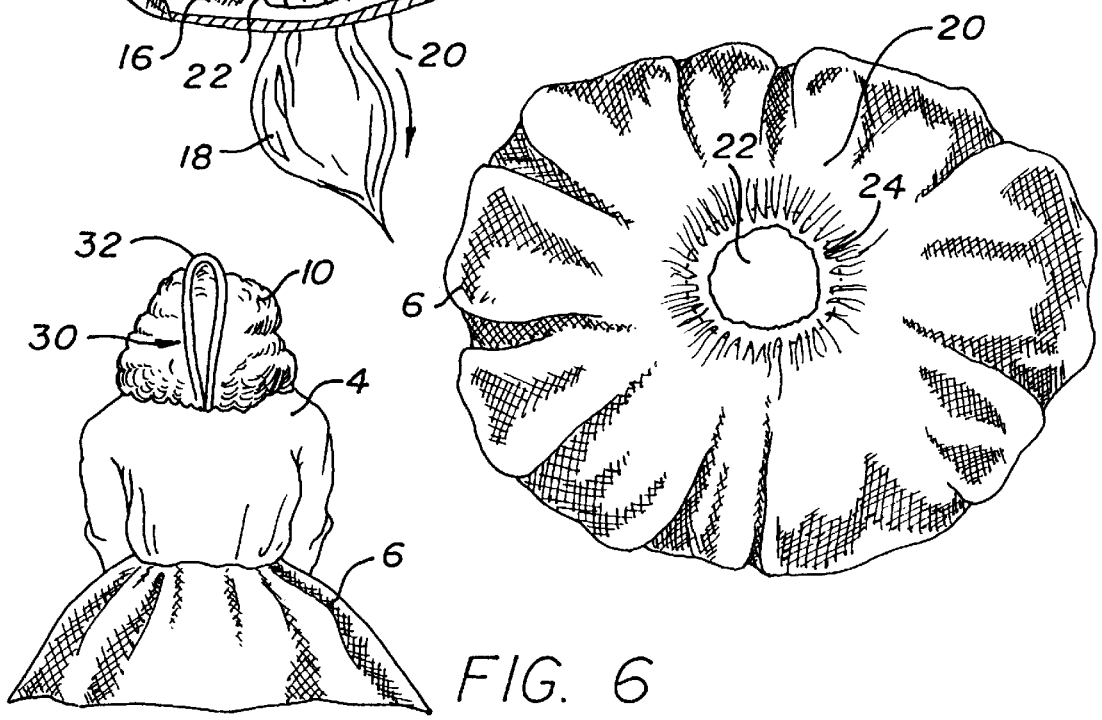

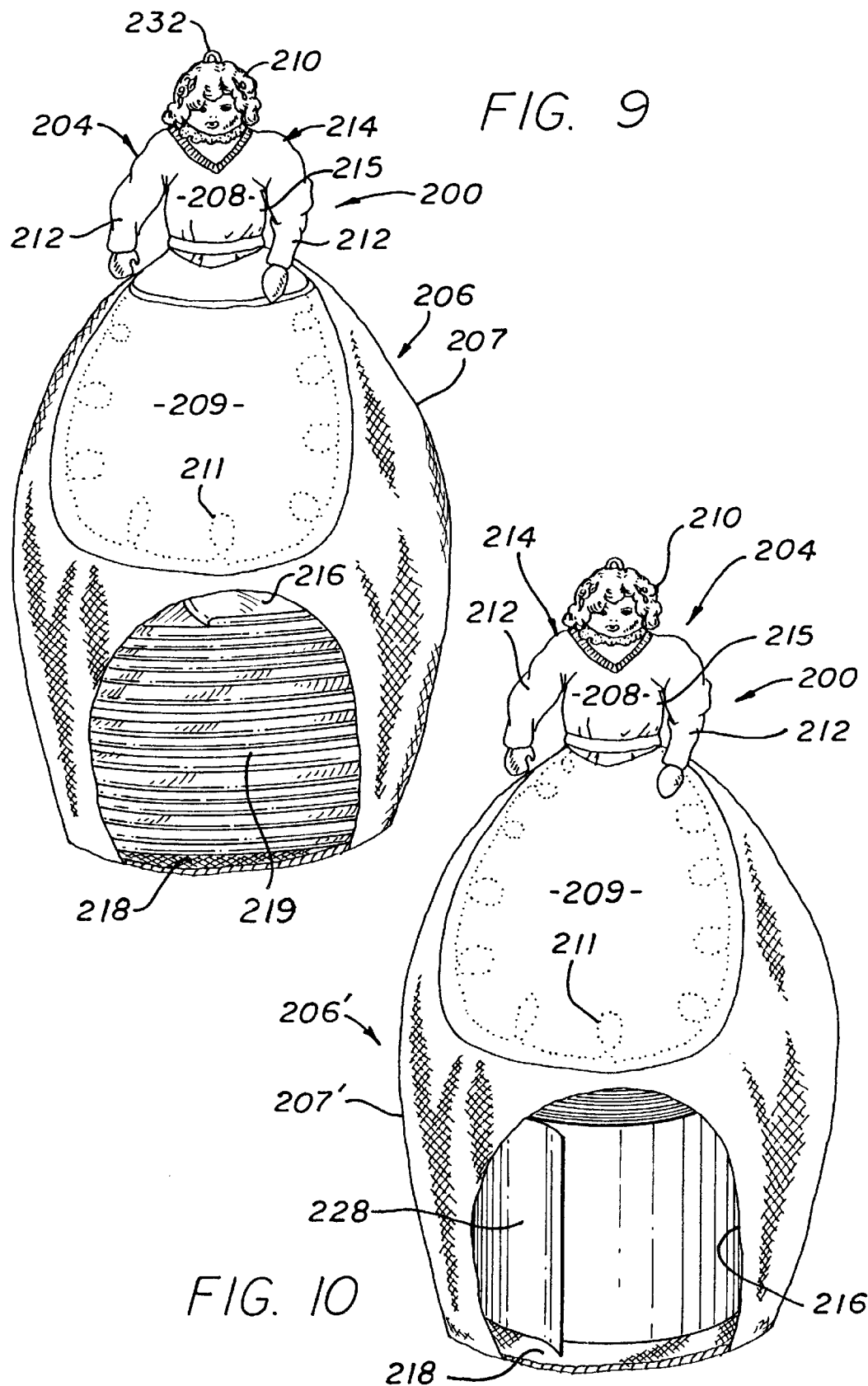

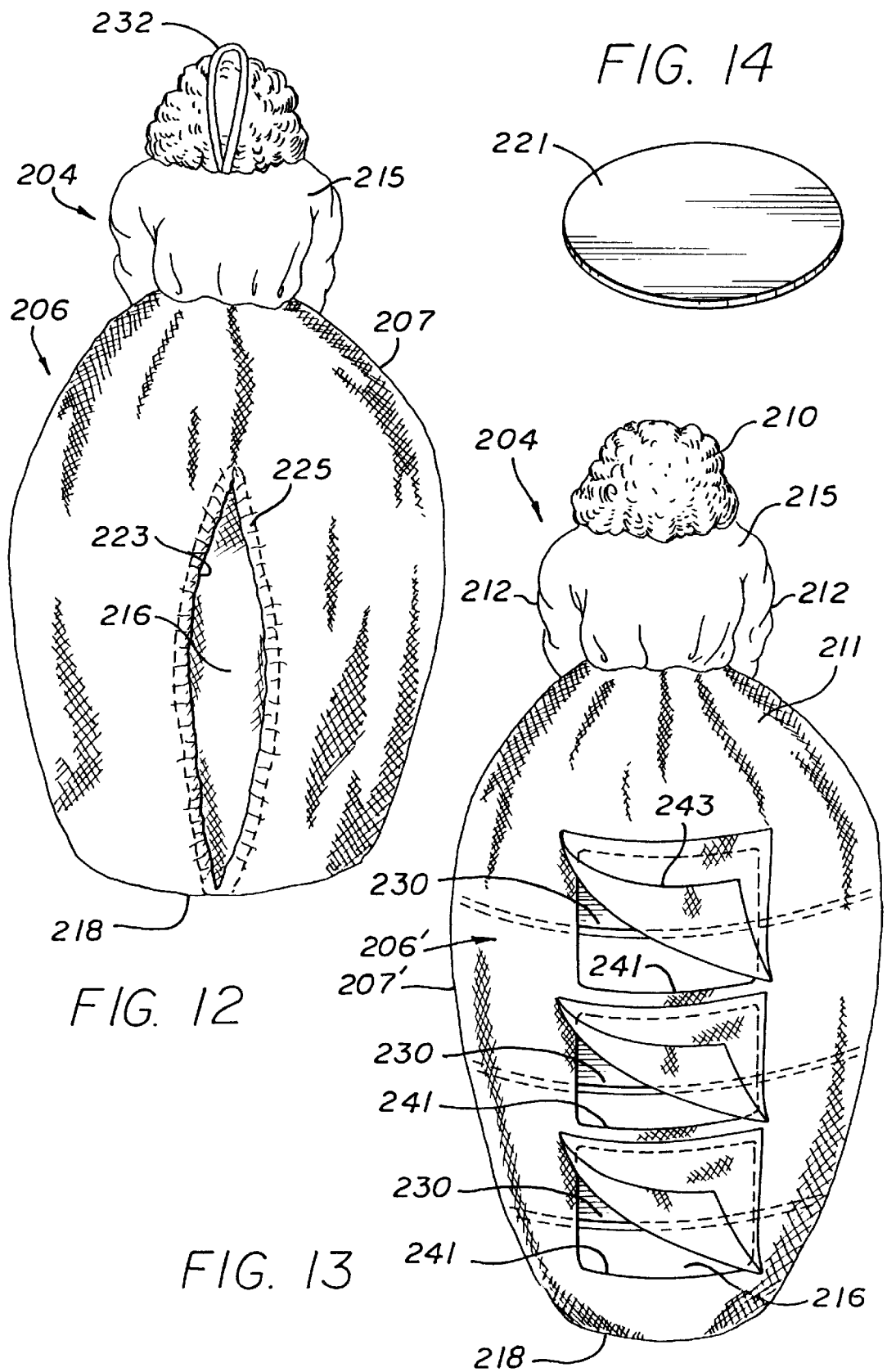

ATTRACTIVE HANGING RECEPTACLE FOR PLASTIC BAGS

The present application is a continuation-in-part application of the application having Ser. No. 08/548,645 filed on Oct. 26, 1995, U.S. Pat. No. 5,687,840, which was a continuation-in-part application of patent application Ser. No. 08/248,665 filed on May 25, 1994 for which U.S. Pat. No. 5,487,467 issued on Jan. 30, 1996 all of which are incorporated in their entirety herein by reference.

BACKGROUND OF THE INVENTION

1. Field of the Invention

The present invention relates generally to a receptacle for the storage and retrieval of plastic shopping bags, as well as for a variety of other, different types of articles. In particular, the present invention relates to an attractive, easy to use receptacle having the shape of a human or animal doll figure which is capable of easily receiving and/or dispensing a variety of articles, including plastic shopping bags, pajamas or other clothing items, diapers, rolls of toilet paper, and the like.

2. Description of the Related Art

It is presently common practice for grocery stores, among other types of stores, to utilize small plastic bags for the purpose of bagging customers' purchases upon checkout instead of the large, brown paper bags used in the past. Presumably, store owners follow this practice because plastic bags are less expensive than paper bags, especially given the rising costs of paper, and are thought to be more convenient to carry. Consequently, many people accumulate these plastic shopping bags and some find other uses for them such as for lining small trash cans, disposing of cat litter, etc. Unfortunately, it has become public knowledge that when plastic shopping bags are disposed of, they typically end up in a garbage dump where they do not disintegrate rapidly, unlike paper bags. Rather, plastic bags take years upon years to decompose and in many cases, choke out sunlight to soil, plant life, etc. and in general, become hazardous to the environment. For these reasons, many supermarkets encourage the recycling of plastic shopping bags by offering recycling bins at store locations where customers can deposit used plastic shopping bags instead of disposing of them, so as to avoid the environmental hazards associated therewith.

Those persons who return their plastic shopping bags for recycling usually tend to amass a large number of them before doing so. People generally store these accumulated plastic bags in a haphazard manner, for example, by folding or crumpling them and placing them in a drawer in the kitchen, thereby utilizing valuable storage area.

In addition to plastic shopping bags, though, there exists a wide variety of articles that are accumulated in the home. For many of these articles, it is convenient to keep several on hand for periodic and/or continuous use. However, for many such articles it would be unsightly to store them in an open, visible place, and consequently, valuable storage space in the home must be utilized in order to store such articles in an out-of-sight location. The variety of article types referred to can include clothing garments, such as pajamas or undergarments, and even diapers, wherein the utilization of a conventional laundry hamper is not convenient or desired. In addition, articles such as diapers require storage at a specific location so as to render them more accessible for repeated use throughout the day. Other articles of this type include toiletry type products, such as, but not limited to, rolls of toilet paper which are often stored in a somewhat stacked array, but almost never in an open, freely accessible location because of the unsightliness or unattractiveness of such products.

As a result, there is a need in the art for a suitably convenient means for storing plastic shopping bags, as well as a variety of different articles, for subsequent use. There is also a need in the art to provide an attractive appearance to any such means for storing a variety of articles in a manner which will not take up conventional storage space. Such a preferred, receptacle should not only be attractive but be structured so as to facilitate convenient dispensing of the stored articles, when such is desired. For instance, it is generally recognized that decorative figures such as dolls appeal to many people, primarily women and children. While the related art generally discloses receptacles or article holders combined with decorative figures, it is believed that no such decorative figures exist in combination with a receptacle structured to have sufficient versatility for storing plastic shopping bags, as well as a large variety of other, different types of articles.

SUMMARY OF THE INVENTION

The present invention is directed towards solving the specific needs associated with providing a receptacle for storing and dispensing plastic shopping bags, as well as a variety of other, different types of articles, and towards providing an attractive decorative figure-shaped receptacle for such storage and dispensing. In accordance with one aspect of the present invention, there is provided a receptacle for plastic shopping bags and like articles comprising an upper member having the general structure and appearance of an upper portion of a doll body, the doll body comprising either a human figure or an animal figure, and a lower element structured and disposed for receiving articles therein. The lower element, which has the general shape and configuration of a skirt, is attached to the upper member and extends downwardly therefrom. The lower element defines a cavity in which plastic shopping bags, or a variety of other articles, can be stored, and also, dependent on the embodiment herein described, has an opening in communication with the cavity that is sized and configured to allow passage therethrough of the article being stored. The receptacle according to the present invention preferably includes structure for suspending the receptacle from a vertical surface, which suspending structure is positioned on the upper member so as to substantially prevent the upper member from falling forward and thereby, allow an upright orientation and therefore, a full display of both the upper member and lower element. In addition, the receptacle of the present invention preferably includes means structured and disposed on the lower element for either partially or fully closing the opening.

Another embodiment of the present invention is directed towards a similar type doll or animal like figure wherein the lower element, and more specifically, the hollow interior defining the cavity thereof, is configured to store a plurality of different types of articles. Such articles may include, but are not limited to, clothing garments, such as wherein the receptacle of the present invention is used to store pajamas or even a plurality of other soiled garments, and thereby, to serve as a small, attractive, laundry-hamper type of structure. In addition, the lower element of the present invention, and more specifically, the hollow interior or cavity thereof, may be structured to store a plurality of articles in a somewhat stacked array. Such stacked articles can include diapers, regardless of whether they are disposable or made of cloth. Alternatively, the articles may be larger and somewhat heavier items such as rolls of toilet paper, containers for various products or other articles which are best stored in a somewhat stacked array.

With these latter embodiments, one feature of the present invention is that the lower element includes a bottom zone which is specifically structured to effectively support, stabilize and facilitate storage of articles in a stacked array. In a related embodiment, the lower element may additionally include a plurality of spaced-apart partitions formed within the cavity thereof, each of which is structured to receive and position therein, at least partially rigid material inserts. These partitions and inserts support as well as stabilize the storage of heavier type articles in the aforementioned stacked array.

Access to the cavity of the lower element is in the form of at least one but in certain embodiments, a plurality of access openings extending along the length of the lower element. The access openings are specifically structured to facilitate passage of the various articles being stored into and out of the cavity. The plurality of access openings are preferably formed in a somewhat longitudinal alignment with one another and are each disposed, dimensioned and configured to facilitate the insertion or removal of a different article from a stacked array, particularly when such articles are somewhat larger or have a semi-rigid configuration such as a roll of toilet paper or the like.

Yet another embodiment of the present invention is directed to an attractive receptacle having an article support structure, which not only serves to store certain articles within the cavity in a stacked array but also is structured to facilitate the vertical, upright positioning of the receptacle without suspending the receptacle on a wall or like vertically oriented, supporting surface.

It is an object of the present invention to provide an easy to use receptacle for conveniently storing and dispensing a variety of different types of articles.

It is a further object of this invention to provide an attractive receptacle in the general shape of a decorative human doll figure for storing plastic shopping bags, as well as a plurality of other articles.

Yet another object of this invention is to provide an attractive receptacle in the general shape of a decorative animal doll figure for storing plastic shopping bags, as well as a plurality of other articles.

Still another object of the present invention is to provide an attractive receptacle for storing and dispensing plastic shopping bags and a variety of different articles which can be conveniently suspended from a vertical support structure or alternatively, structured for upright positioning on a floor or a similar, horizontal support surface for display and use of the receptacle.

BRIEF DESCRIPTION OF THE DRAWINGS

The present invention will be better understood with reference to the Detailed Description of the presently preferred embodiments thereof, in which:

FIG. 1 illustrates a front perspective view and a partial cut-away view of one embodiment of the receptacle according to the invention.

FIG. 2 illustrates a bottom view of the receptacle shown in FIG. 1.

FIG. 3 illustrates a partial side view of the receptacle shown in FIG. 1 with a towel being retained by the arms thereof.

FIG. 6 illustrates a partial rear view of the receptacle shown in FIG. 1 and illustrating suspension means connected thereto.

FIG. 9 illustrates a front perspective view in partial cut-away showing the interior and exterior portions of another embodiment of the present invention.

FIG. 10 illustrates a front perspective view and a partial cut-away view showing exterior and interior portions of another embodiment of the present invention.

FIG. 12 illustrates a rear perspective view of the embodiment of the invention shown in FIG. 9.

FIG. 13 illustrates a rear perspective view of the embodiment of the invention shown in FIG. 10.

FIG. 14 illustrates a perspective view of a structural component of the embodiments of FIGS. 9 and 10.

Like reference numerals refer to like parts throughout the several views of the drawings.

DETAILED DESCRIPTION OF THE PREFERRED EMBODIMENT

Figure 4:
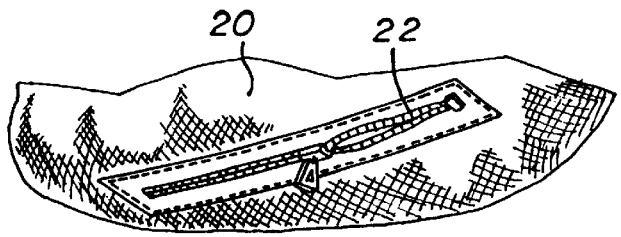
FIG. 4 illustrates one preferred embodiment of means for closing the lower element of the receptacle.
Figure 5:
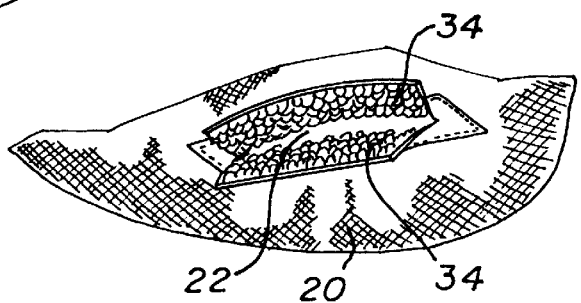
FIG. 5 illustrates an alternative embodiment of means for closing the lower element of the receptacle.

Shown throughout FIGS. 1 through 8, there is shown an attractive hanging receptacle according to the present invention, generally designated 2, which is structured and configured for removably receiving plastic shopping bags and similar lightweight articles. As shown throughout the drawings, receptacle 2 includes an upper member 4 and a lower element 6, perhaps best illustrated in FIG. 1. In a first preferred embodiment and as shown in FIGS. 1–6, upper member 4 is shaped and configured as the upper portion of a human doll body extending generally from the waist upwards, and preferably includes a torso 8, a head 10, and a pair of arms 12, 12'. Most preferably, the upper portion has the general appearance of a female doll body although it will be appreciated that a male doll body would work suitably as well. In another preferred embodiment illustrated in FIG. 8, upper member 104 is shaped and configured as the upper portion of an animal doll body, such as a pig, although it will be understood that upper member 104 could be configured to represent enumerable other types of animals, such as but not limited to, a cow, horse, lamb, bird, fish, frog, dinosaur, etc. In this embodiment as well, upper member 104 extends generally from the waist upwards, and preferably includes a torso 108, a head 110, and a pair of arms 112, 112'.

Figure 7:
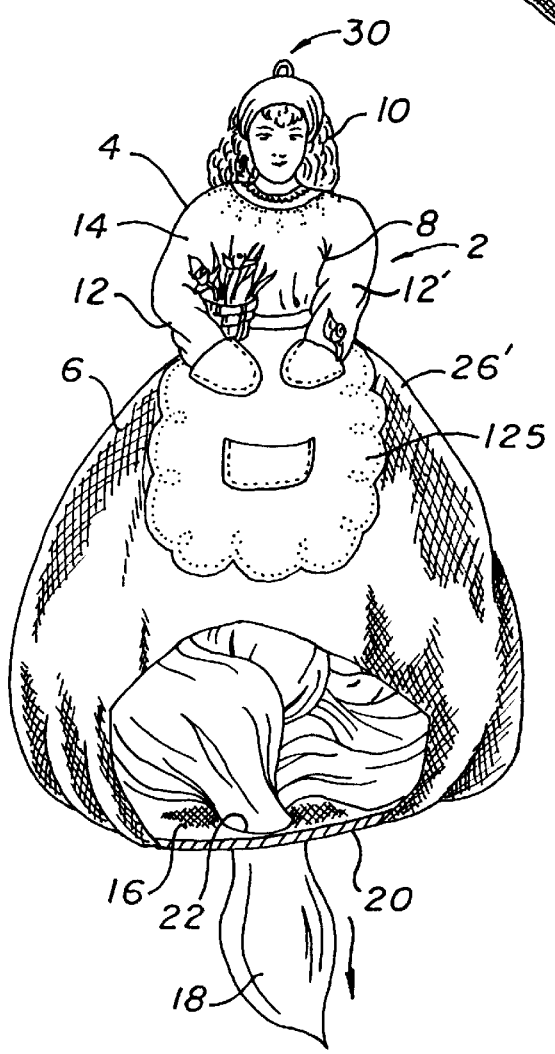
FIG. 7 illustrates another embodiment of the receptacle according to the invention wherein the receptacle also has the general structure and appearance of a female doll figure with the head portion being made of porcelain.
Figure 8:
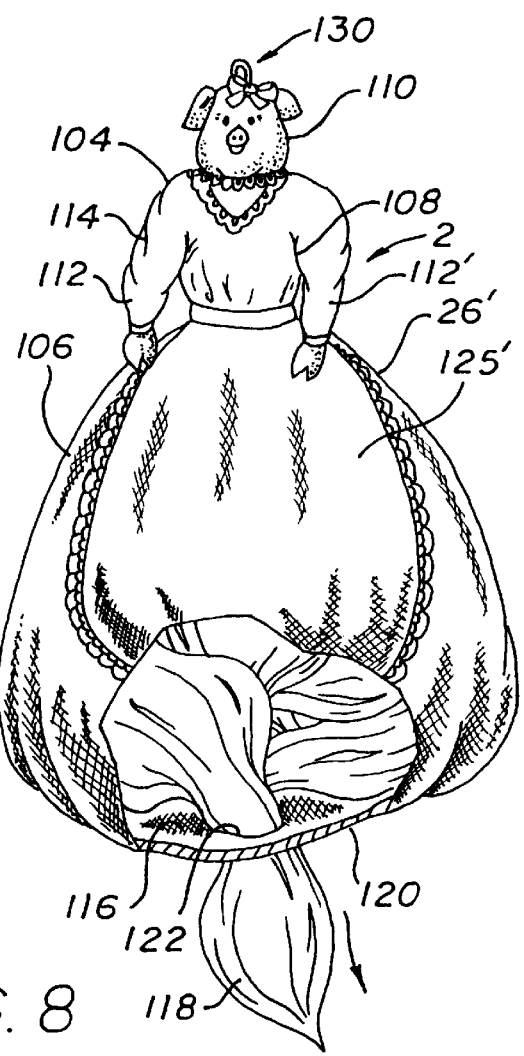
FIG. 8 illustrates an alternative embodiment of the receptacle of the present invention wherein the receptacle has the general structure and appearance of an animal doll figure.

In these embodiments, upper member 4, 104, preferably comprises an outer shell constructed of cloth which defines torso 8, 108 and also preferably, a pair of arms 12, 12', 112, 112' of the doll body and/or animal body, and an inner support element disposed within torso 8, 108 formed of cotton batting, foam rubber or any other suitable resilient material. If desired, arms 12, 12', 112, 112' may also include an inner support element disposed therein also formed of cotton batting, foam rubber or any other suitable resilient material. Head 10, 110 may be constructed of wood, plastic, or even cloth stuffed with support material, and is attached to torso 8, 108 by gluing, sewn stitching or any other conventional means of attachment. Head 10 is preferably attractively decorated with the face of a woman wearing makeup, and may include a hairpiece thereon. As illustrated in FIG. 7, head 10 may even be constructed of porcelain so as to offer a fine, high quality and beautifully faced doll, and in addition to a hairpiece, may include other ornamental and decorative items such as flowers, a hat, bandanna, etc. As shown throughout FIGS. 1 through 8, upper member 4, 104 is provided with an outer garment 14, 114 constructed preferably of fabric material, which may be a separate blouse 14 as shown in FIG. 1 or the upper section of a long dress 114 as shown in FIG. 8. Outer garment 14, 114 may be securely connected to upper member 4, 104 preferably at the juncture of torso 8, 108 and head 10, 110.

Referring now to FIGS. 1 through 6, lower element 6 has the general shape and configuration of a long skirt which extends downwardly from upper member 4. Additionally, lower element 6 may be constructed of any suitable material for containing plastic bags and like lightweight articles therein, and in the preferred embodiment is constructed of fabric material and integrally formed with outer garment 14 of upper member 4 as the skirt portion of a long dress. It will be appreciated, however, that lower element 6 may be a separate skirt that is securely attached to outer garment 14 or upper member 4 by any conventional means of attachment such as sewing. The foregoing is also true of the lower element on the other embodiments. It will also be appreciated that lower element 6 may include an additional layer of fabric, attached thereto for decorative purposes, such as to provide an apron 125, 125' as illustrated in FIGS. 7 and 8.

Lower element 6 defines a cavity 16 in which an article, such as a plastic bag 18, may be removably received, and in the preferred embodiment has a bottom zone 20 defining an opening 22 which is sized and configured to allow passage therethrough of plastic bag 18. It will be understood from the figures that opening 22 is most preferably located at the bottom of zone 20 so as to not detract from the attractive skirt and general decorative appearance of the receptacle 2. In one embodiment not shown, opening 22 may be sized just large enough to allow passage therethrough of plastic bag 18 while at the same time being sized small enough so as to contain plastic bag 18 within cavity 16 after being received therein. In the preferred embodiment of the invention, closure means are provided for releasably closing opening 22, either partially or fully, so as to securely captivate plastic bag 18 within cavity 16. In the embodiment illustrated in FIG. 2, an expandable elastic band 24 is sewn within bottom zone 20 in surrounding relation to opening 22 so as to effect a partial closure of opening 22. In this partially closed condition, opening 22 is sized so as to prevent plastic bag 18 from falling out of cavity 16, and requires the user to stretch elastic band 24 and enlarge opening 22 in order to insert plastic bag 18 into, or remove plastic bag 18 from, cavity 16 through opening 22. In other preferred embodiments shown in FIGS. 4 and 5, respectively, hook and loop fastening material 34 or a zipper 36 may be provided for substantially yet releasably closing opening 22. It will be appreciated by those skilled in the art, however, that any suitable means for effecting a partial or complete closure of opening 22 can be utilized, such as snap fasteners or a drawstring. The foregoing is also true of the lower element on the other embodiments illustrated in FIGS. 7 and 8.

As perhaps best seen in FIGS. 3 and 6, the receptacle of this invention may include means for suspending receptacle 2 from a surface such as an outer sidewall of a refrigerator or a structural wall or cabinet within a home. In the preferred embodiment, the suspension means 30 comprise a loop of string 32 connected to an external rear surface of upper member 4. It will be readily understood, however, that any other conventional means for suspending receptacle 2 may be used, such as a hook member, twist tie, etc. It will also be appreciated that suspension means 30, 130 are most preferably operably connected to upper member 4 in a manner so that upon hanging receptacle 2 from a vertical surface, upper member 4 will not tilt forwardly. For this reason, suspension means 30 will be operably connected to an external rear surface of upper member 4 at any point above the receptacle's center of gravity and most preferably, generally adjacent the base of head 10 as illustrated in FIG. 6, or to the neck or shoulder area of upper member 4. In this way, the suspension means will act to substantially prevent the upper member from falling forward and will thereby allow a full display of both the upper member and lower element when the receptacle is suspended. For convenient use of receptacle 2, loop 32 may be engaged with the hook end of a magnetic member that is securely attached to the sidewall or door of a refrigerator, so that receptacle 2 will be suspended vertically in an appropriate location for storage of plastic bag 18.

In an alternative embodiment shown in FIGS. 1 and 3, the distal ends 26, 26' of arms 12, 12' are connected together to form a holding member for a dish towel 40 or like item, although it will be recognized that the invention may omit this feature.

Turning now to the alternative preferred embodiments of the invention illustrated in FIGS. 9 through 15, the receptacle is generally indicated as 200 and is also seen to include an upper member 204 and a lower element 206. As with the embodiments shown in FIGS. 1–8, the receptacle 200 is preferably defined by an attractive doll-like figure, whether human or animal, and includes a torso, 208 primarily defining the upper member 204. The torso 208 preferably includes a head portion 210 which further, is appropriately decorated with hair and/or other decorative ornamentation, and outwardly extending arms, 212. The torso is "dressed" in a surrounding outer garment 214 formed of any type of suitable material such as fabric or the like and may also be appropriately decorated. The fabric of the outer garment 214 may be shaped to take the form of a blouse 215, which may be coordinated to the lower element 206. The lower element 206, is dimensioned, shaped and configured to correspond generally to the upper torso, and specifically to the blouse 215 of the receptacle 200, and accordingly, is preferably structured to represent a skirt 207. The skirt 207 may itself include any type of decorative features, including an apron 209 having attractive indicia or the like thereon as at 211. The lower element 206, and particularly, the skirt 207 has a substantially hollow interior, thereby defining an interior cavity 216. Further, the cavity 216 includes a bottom zone as at 218 which differs somewhat in structural integrity and overall configuration from the embodiments of FIGS. 1–8.

More specifically, the attractive receptacle 200 comprising the embodiments of FIGS. 9 and 10 is designed to hold a variety of different types of articles, rather than just plastic bags or articles similar thereto. With reference to the embodiment of FIG. 9, the lower element 206 is specifically structured to include a rigid bottom zone 218 to support and contain a plurality of articles, such as diapers 219 or other garments or articles within the cavity 216 which is structured to accommodate such articles being arranged in a generally stacked array. As shown in FIG. 9, the stacked array of articles rests primarily on the bottom zone 218 which, as set forth above, preferably is structured to have added strength or rigidity. For example, and with reference to FIG. 14, the lower element 206 may be structured to receive at least one insert 221 therein, which insert is preferably formed of an at least partially, rigid material and which is preferably disposed within cavity 206 adjacent or on top of the bottom zone 218, so as to increase the structural integrity or overall rigidity of the bottom zone 218, and thereby, to stabilize and render more accessible the plurality of articles 219 disposed in the aforementioned stacked array as shown in FIG. 9. Naturally, a wide variety of other articles may be stored within the cavity 216 of the receptacle 200 and periodically retrieved or dispensed therefrom. Such articles may include articles of clothing, such as pajamas which are used continuously for a few days. In addition, the decorative receptacle 200, as shown in FIG. 9, can be used as a small laundry hamper for preferred articles of clothing, such as under garments, panty-hose, socks, or the like, which are normally separated from other soiled garments during washing. Of course, articles of this type need not be folded during storage as are the articles 219 in FIG. 9.

Further, the embodiment of the invention shown in FIGS. 9 and 12 additionally comprises an access opening 223. With reference to FIG. 12, the access opening 223 may comprise a substantially elongated opening 223 disposed in the lower element 206 and preferably, along the rear surface of the skirt 207. Most preferably, the access opening 223 extends from a point at least midway along the length of the skirt 207 down to approximately or adjacent the bottom zone 218. Further, closure means in the form of an elastic band, button or snap closures or the like, as at 225, may be secured along the peripheral edges of the access opening 223 so as to permit at least a partial closure of the opening 223, if desired. Accordingly, the access opening 223 of the invention depicted in FIG. 12 may be readily opened by expanding the elastic band 225. It will be appreciated that the configuration and dimension of the access opening 223 is such as to readily allow a variety of different articles, including pajamas or other garments 219, or even diapers, to pass therethrough, into and out of the cavity 216.

Figure 15:
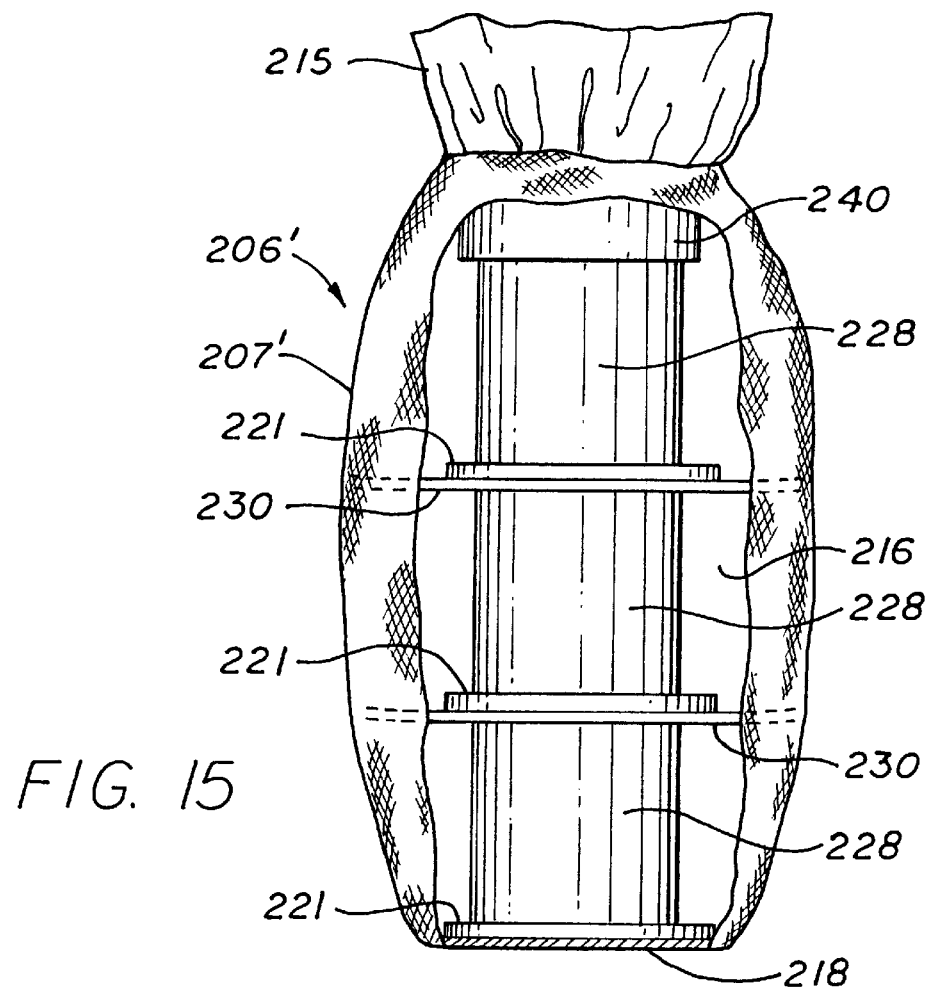
FIG. 15 illustrates a sectional view in partial cutaway showing structural details of the embodiment of FIGS. 10 and 13.

Referring now to the embodiment of the invention depicted in FIGS. 10, 13 and 15, the versatility of the receptacle 200 will again be appreciated in view of the following discussion. As with the other embodiments, the lower element 206' is preferably structured to assume the general configuration of a skirt as at 207'. However, this embodiment differs from that discussed with reference to FIG. 9 in that the articles to be stored in the lower element 206' and subsequently retrieved or dispensed, may comprise a plurality of at least semi-rigid articles, such as but not limited to, rolls of toilet paper, 228. Further, the rolls or like articles 228 are preferably maintained in a somewhat vertically oriented, stacked array with this embodiment, as best shown in FIG. 15. While not strictly necessary, the embodiment of the invention shown in FIGS. 13 and 15 maintains the articles 228 in a stacked array by the inclusion of a plurality of partitions 230 formed as part of the lower element 206' and extending at least partially into the interior of the cavity 216'. The partitions are preferably formed of a washable fabric as is the remainder of lower element 206', and preferably, are secured in transverse relation to the length of the lower element 206' and/or skirt 207'. Further, the partitions 230 are preferably arranged in spaced relation to one another and are formed to receive an insert 221 of a rigid or semi-rigid material therein to add rigidity and thereby, define somewhat of a support platform for the rolls 228. Alternatively, the inserts 221 may be formed of a lightweight but at least partially rigid material such as but not limited to corrugated paper or cardboard. Preferably, one insert 221 is removably inserted into and/or mounted on each of the partitions 230 so as to define a support platform for each of the toilet paper rolls or like articles 228 placed thereon. Again, the partitions 230 of the lower element 206' are preferably structured and disposed to permit removal of the inserts 221 so as to allow for the laundering of the lower element 206'.

It will be appreciated from FIGS. 10 and 13 that the arrangement of the plurality of toilet paper rolls 228 in a stacked array serves to define an assembly in the general form of a vertical support column. This vertical support column allows the entire receptacle 200 of FIGS. 10, 13 and 15, to be positioned in an upright, vertically oriented position without requiring that the assembly be suspended as by suspension member or loop 232. While a suspension member may still be utilized, if desired, the embodiment of FIGS. 10, 13 and 15 may also be placed on a floor, a shelf, a table or any like horizontal supporting surface. That is, the upper member 204 of the invention is disposed to rest effectively on the top end of the upper most roll of toilet paper 228. Alternatively, the lower end 240 of upper member 204 may be structured to include a frame for engaging the top side of the upper most roll of toilet paper 228, as best represented in FIG. 15 or even a stub member sized to be inserted into the hollow interior of the roll's cardboard tube in order to provide the receptacle's torso portion with sufficient rigidity to assume an upright, vertically oriented position. Therefore, the cooperation of the structural features including the plurality of partitions 230, and the plurality of inserts 221 thereon define the article support for the stacked array of articles 228. This article support structure not only serves to support the articles in a stacked array but also serves to orient the entire receptacle 200, of the embodiment of FIGS. 10, 13 and 15, in a vertically upright position on any applicable horizontal surface without the need of the suspension member or loop 232. However, it should again be noted that a suspension member, such as loop 232, may in fact be presented on the embodiment of FIGS. 10 and 13, if it is desired to alternately allow the receptacle to be supported on a wall or other vertical support structure as desired.

Further with regard to the embodiment of FIG. 13 an access structure comprises a plurality of spaced apart longitudinal aligned openings as at 241. These openings are each disposed, dimensioned and configured to remove a different one of the stacked articles 228 from the cavity 216 as desired. It should be noted that the placement of each of the openings 241 is such as to allow removal of a different one of the articles 228 (See FIG. 15) with which it is substantially aligned. The number of openings 241 may vary. In addition, a cover assembly is provided as shown in the embodiment of FIG. 13 to initially or normally close each of the openings 241. Such cover assembly is in the form of a plurality of covering flaps as at 243 disposed in normally overlying relation to the respective openings 241 but easily positioned so as to provide access to cavity 216. In addition, the flaps 243 are specifically designed and configured to effectively blend into the configuration of the skirt 207', thereby adding to the overall decorative and attractive appearance of the receptacle 200.

Figure 11:
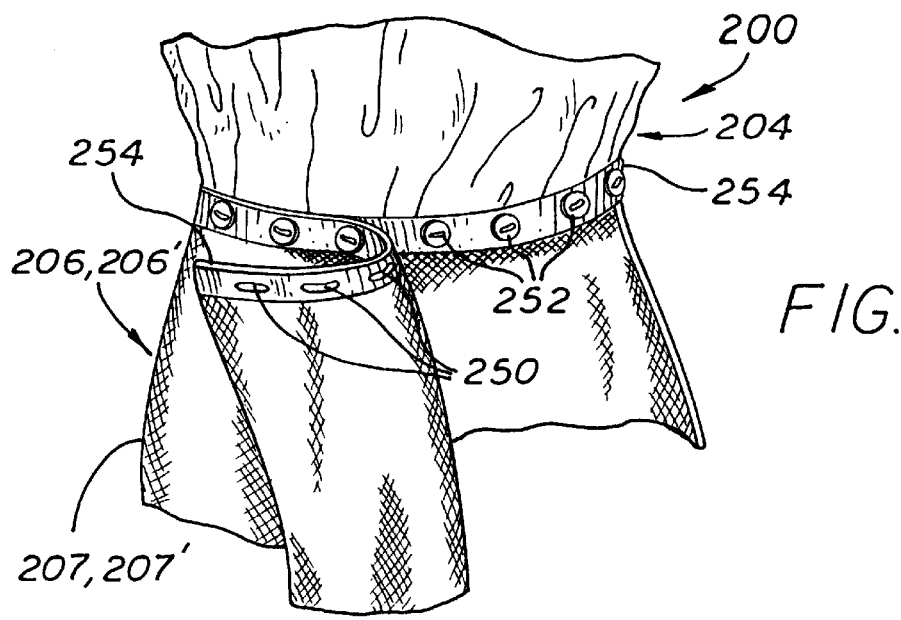
FIG. 11 illustrates a perspective view in partial cutaway showing structural features of the embodiment of FIG. 9.

A unique feature of the present invention is shown in FIG. 11 and comprises the inclusion of connecting means to removably attach the lower element 206 to the upper member 204. Preferably, the connecting means are in the form of a plurality of mating connector elements, 250, 252 secured and disposed to cooperate between a lower peripheral portion of upper element 204 and upper peripheral portion, 254 of the lower element or skirt 206, 207 or 206', 207'. Such connectors elements 250, 252 may be defined for example, by a plurality of buttons and button holes, mating snaps elements, hook and loop type fasteners of the type shown in FIG. 5 and/or even a zipper structure of the type shown in FIG. 4. The purpose of removing the lower element 206, 206' from the upper member 204 is to allow cleaning or washing of the lower element 206 by conventional means. Naturally, in the embodiment of FIGS. 10 and 13, the semi-rigid material inserts 221 are first removed from the cavity 216 prior to any washing thereof.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A decorative receptacle for the storage and retrieval of a variety of different types of articles, said receptacle comprising:
   a) an upper member having the general configuration and appearance of a doll and comprising a head and torso,
   b) a lower element having a first upper end and a second outer most end, said lower element being removably attached to said upper member generally at said first upper end thereof and extending downwardly from said upper member; said lower element being structured and configured to define a general shape of a skirt;
   c) said lower element having a substantially elongated configuration and an at least partially hollow interior portion defining a cavity dimensioned and configured to receive a variety of different types of articles therein;
   d) said lower element further including a bottom zone disposed generally at said second outer most end thereof when said lower element is connected to said upper member;
   e) said bottom zone disposed and structured to at least partially support articles contained within said cavity;
   f) an access structure including at least one opening formed in said lower element between said bottom zone and said first upper end of said lower element,
   g) said access structure disposed to provide access to said cavity and dimensioned to allow passage of articles therethrough into and out said cavity,
   h) a suspension member connected to said upper member which is structured and disposed to removably support said upper member and attached lower element in a substantially vertically oriented, upright position on a vertically disposed supporting member,
   i) a connecting assembly mounted at least in part on said first upper end of said lower element, said connecting assembly being structured and disposed to removably attach said lower element to said upper member; and
   j) said connecting assembly comprising a plurality of connector elements disposed in spaced relation to one another about a peripheral portion of said first upper end of said lower element, said connecting assembly further comprising a corresponding number of cooperating connector elements positioned on said upper member in mating relation to said plurality of connector elements.

2. A receptacle as recited in claim 1 wherein said access structure is formed in a rear exterior surface of said lower element and includes a substantially elongated configuration extending along a length of said lower element.

3. A receptacle as recited in claim 1 wherein said access structure includes a closure means attached in cooperative relation to said at least one opening, said closure means being structured and disposed to facilitate selective opening and at least partial closure thereof.

4. A receptacle as recited in claim 1 wherein said connecting assembly comprises a plurality of buttons and button holes correspondingly positioned on said lower element and said upper member, respectively.

5. A receptacle as recited in claim 1 wherein said bottom zone is structured to support a plurality of articles in a substantially stacked array, with said bottom zone further structured to receive thereon a lower most one of the stacked array of articles such that the stacked array extends upwardly therefrom within said cavity.

6. A receptacle as in claim 5 wherein said access structure comprising at least one opening extends from said bottom zone upwardly along a length of said lower element towards said upper end thereof sufficient to facilitate access to a majority of the articles defining the stacked array.

7. A receptacle as in claim 5 further comprising a support member mounted adjacent said bottom zone and formed of an at least partially rigid material, said support member being structured and disposed to provide stabilizing support to the stacked array.

8. A receptacle as in claim 7 wherein said support member is removably mounted within said cavity in overlying relation to said bottom zone and in underlying, supporting relation to the stacked array.

9. A decorative receptacle for the storage and retrieval of a variety of different type articles, said receptacle comprising:
   a) an upper member having a general configuration and appearance of a doll and comprising the head and a torso,
   b) a lower element attached to said upper member and extending downwardly therefrom, said lower element being structured and configured to define a shape having the general form of a skirt;
   c) said lower element including a substantially elongated configuration and an at least partially hollow interior portion defining a cavity dimensioned and configured to receive a variety of different type articles therein;
   d) said lower element further including a bottom zone disposed generally at an outer most end thereof when said lower element is connected to said upper member;
   e) said bottom zone structured and disposed to at least partially support articles contained within said cavity in a substantially stacked array,
   f) an access structure formed in said lower element between said bottom zone and an opposite end of said lower element,
   g) said access structure disposed to provide access to said cavity and dimensioned to allow passage of articles within said stacked array into and out of said cavity,
   h) an orientation assembly mounted at least in part on said lower element and structured to facilitate a substantially vertically oriented, upright position of said upper member and lower element on a substantially horizontal supporting surface, i) said orientation assembly being further structured in cooperation with said stacked array to at least partially support said upper member and said lower member along a portion of the length of said lower member;

j) said orientation assembly comprising an article support structure mounted within said cavity and disposed and configured to individually support the articles in said stacked array;

k) said article support structure comprising a plurality of support members removably mounted within said cavity in spaced relation to one another and in substantially transverse relation to and along a length of said lower element, each of said support members disposed in supporting relation to at least one of the articles in said stacked array, said support members being collectively disposed to maintain the articles in a substantially vertically oriented stacked array; and l) a plurality of flexible material partitions fixedly secured within said cavity and spaced relation to one another; each of said partitions dimensioned and configured to removably support one of said plurality of support members thereon.

10. A receptacle as recited in claim 9 wherein at least one of said support members is mounted adjacent said bottom zone in supporting engagement with a lower most article in the stacked array.

11. A receptacle as in claim 9 wherein said plurality of support members are formed of an at least partially rigid material of sufficient structural integrity to support and orient the stacked array of articles in a configuration defining a vertical support column for said upper member and lower element.

12. A decorative receptacle for the storage and retrieval of a variety of different type articles, said receptacle comprising:

a) an upper member having a general configuration and appearance of a doll and comprising the head and a torso, b) a lower element attached to said upper member and extending downwardly therefrom, said lower element being structured and configured to define a shape having the general form of a skirt;

c) said lower element including a substantially elongated configuration and an at least partially hollow interior portion defining a cavity dimensioned and configured to receive a variety of different type articles therein;

d) said lower element further including a bottom zone disposed generally at an outer most end thereof when said lower element is connected to said upper member;

e) said bottom zone structured and disposed to at least partially support articles contained within said cavity in a substantially stacked array, f) an access structure formed in said lower element between said bottom zone and an opposite end of said lower element, g) said access structure disposed to provide access to said cavity and dimensioned to allow passage of articles within said stacked array into and out of said cavity, h) said access structure comprising a plurality of openings disposed in spaced, longitudinally aligned relation to one another and being collectively dimensioned to extend along said stacked array of articles within said cavity; and i) an orientation assembly mounted at least in part on said lower element and structured to facilitate a substantially vertically oriented, upright position of said upper member and lower element on a substantially horizontal supporting surface.

13. A receptacle as in claim 12 wherein each of said plurality of openings are disposed and dimensioned to facilitate passage therethrough of at least a different one of the articles of the stacked array.

14. A receptacle as in claim 12 further comprising a cover assembly structured to normally overlie said plurality of openings in covering relation thereto and further structured to be movably positioned into a non-covering relation to said plurality of openings, whereby clear access to said plurality of openings is facilitated.

15. A receptacle as in claim 14 wherein said cover assembly is further structured and disposed to substantially conform to said shape in the general form of the skirt.

16. A receptacle as in claim 15 wherein said cover assembly comprises a plurality of cover members equal in number to the plurality of openings with each cover member normally disposed in covering relation to a different one of said plurality of openings.

* * * * *